No. 664,613. Patented Dec. 25, 1900.
J. BADGER.
SCISSORS.
(Application filed Aug. 25, 1900.)
(No Model.)
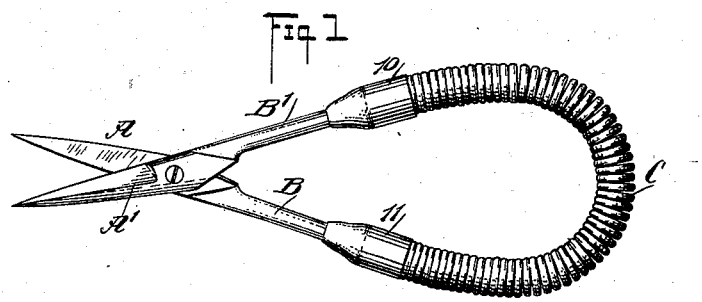
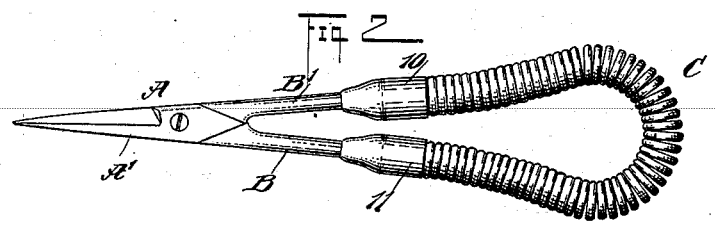
WITNESSES:
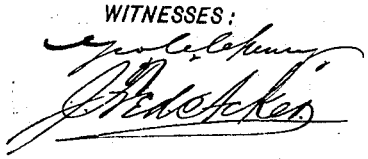
INVENTOR
Jonathan Badger,
BY Munn & C
ATTORNEYS

UNITED STATES PATENT OFFICE.

JONATHAN BADGER, OF NEW YORK, N. Y.

SCISSORS.

SPECIFICATION forming part of Letters Patent No. 664,613, dated December 25, 1900.

Application filed August 25, 1900. Serial No. 27,985. (No model.)

*To all whom it may concern:*

Be it known that I, JONATHAN BADGER, a citizen of the United States, and a resident of the city of New York, borough of Manhattan, in the county and State of New York, have invented a new and useful Improvement in Scissors, of which the following is a full, clear, and exact description.

The purpose of the invention is to connect the shanks of scissor or shear blades by a spring which will act as a handle and normally hold the blades apart or in a position to receive an object, the blades being quickly brought into cutting action by pressing the end portions of the spring toward one another.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1 is a plan view of a pair of scissors having the improvement applied, the blades being is open position; and Fig. 2 is a plan view of a pair of scissors with the improvement applied, the blades of the scissors being shown closed.

A and A' represent the blades of a pair of scissors or shears which are pivotally connected in the usual manner, and the said blades are provided with the customary shanks B and B', which heretofore have been provided with loops to receive the fingers and thumb of a hand. In the improved construction, however, the said loops or eyes are omitted, and instead of them sleeves 10 and 11, forming sockets, are rigidly secured to the rear ends of the shanks B and B', and the ends of a coil-spring C are secured in these sleeves or sockets in any approved manner. This coil-spring may be of any suitable gage of wire and may be as long as necessary and constitute the handle of the scissors or shears. When the spring-handle is secured to the shanks of the scissor-blades, said spring is bowed, and the tendency of the end portions of the spring is to move outward or away from each other. Consequently when the scissors, provided with the improved handle, are not in use the blades will be held apart at their points. When the scissors are to be brought into action, it is simply necessary to press the end portions of the spring-handle together or in direction of each other, whereupon the blades will close in the manner usual to scissors and shears.

Having thus described my invention, I claim as new and desire to secure by Letters Patent—

A cutting instrument, having pivotally-connected blades, and a bowed spiral spring, the ends of which spring are connected with the blades and constitute a handle for the instrument.

In testimony whereof I have signed my name to this specification in the presence of two subscribing witnesses.

JONATHAN BADGER.

Witnesses:
J. FRED. ACKER,
JNO. M. RITTER.